United States Patent
Streat (10) Patent No.: US 6,689,277 B2
(45) Date of Patent: Feb. 10, 2004

(54) TREATMENT OF LIQUIDS WITH BALLASTED FLOCCULATION

(75) Inventor: Philip Streat, Boca Raton, FL (US)

(73) Assignee: Parkson Corporation, Ft. Lauderdale, FL (US)

( * ) Notice: Subject to any disclaimer, the term of this patent is extended or adjusted under 35 U.S.C. 154(b) by 0 days.

(21) Appl. No.: 10/283,924

(22) Filed: Oct. 30, 2002

(65) Prior Publication Data

US 2003/0222027 A1 Dec. 4, 2003

Related U.S. Application Data

(62) Division of application No. 09/845,905, filed on Apr. 30, 2001, now Pat. No. 6,517,714.

(51) Int. Cl.$^7$ .................................................. C02F 1/52
(52) U.S. Cl. ........................ 210/711; 210/712; 210/713; 210/714; 210/727; 210/738
(58) Field of Search ................. 210/711, 712, 210/713, 714, 726, 727, 738, 801–804, 195.2, 195.3, 195.4, 202, 205, 207, 208, 252, 262, 521, 522

(56) References Cited

U.S. PATENT DOCUMENTS

| | | |
|---|---|---|
| 2,352,772 A | 7/1944 | Darby |
| 2,366,898 A | 1/1945 | Gurney |
| 3,615,025 A | 10/1971 | Rice et al. |
| 3,779,910 A | 12/1973 | Chatfiled |
| 3,813,851 A | 6/1974 | Eder |
| 3,898,164 A | 8/1975 | Hsiung |
| 3,963,624 A | 6/1976 | Henderson et al. |
| 4,303,517 A | 12/1981 | Love et al. |
| 4,859,325 A | 8/1989 | Cormier |
| 4,927,543 A | 5/1990 | Bablon et al. |
| 5,277,806 A | 1/1994 | Kuntz |
| 5,676,834 A | 10/1997 | Kuntz |
| 5,730,864 A | 3/1998 | Delsalle et al. |
| 5,770,091 A | 6/1998 | Binot et al. |
| 5,800,717 A | 9/1998 | Ramsay et al. |
| 5,840,195 A | 11/1998 | Delsalle et al. |
| 6,010,631 A | 1/2000 | Delsalle et al. |
| 6,197,190 B1 | 3/2001 | Hanlon |
| 6,277,285 B1 | 8/2001 | Vion |
| 6,383,370 B1 * | 5/2002 | Keever et al. ............. 210/96.1 |
| 6,517,714 B2 * | 2/2003 | Streat ...................... 210/195.4 |

* cited by examiner

Primary Examiner—Peter A. Hruskoci
(74) Attorney, Agent, or Firm—Baker Botts L.L.P.

(57) ABSTRACT

In the typical embodiments disclosed in the specification, a ballasted flocculation liquid treatment arrangement includes a mixing chamber in which liquid to be treated, flocculating agents and granular material are mixed. The mixture is supplied to the bottom of a flocculating chamber adjacent to the mixing chamber through an opening in a common wall between the chambers and is maintained in suspension in the flocculating chamber by turbulence generated by a rotating blade array. Ballasted flocs are transferred from the flocculation chamber to an adjacent sludge tank through a first opening in a common wall between them and liquid which contains lighter flocs is returned to the flocculation chamber through a second opening in the common wall. Liquid from the flocculation chamber passes upwardly through a turbulence control arrangement where flocs and particulates are substantially removed and into a clarification chamber where clarified liquid is passed over a weir to an outlet. Sludge and granular material from the bottom of the sludge tank are conveyed by an airlift to a cleaning device above the mixing chamber where the granular material is cleaned and returned to the mixing chamber while sludge is carried away through a disposal outlet.

10 Claims, 12 Drawing Sheets

TREATMENT OF LIQUIDS WITH BALLASTED FLOCCULATION

This is a divisional of U.S. patent application Ser. No. 09/845,905 filed Apr. 30, 2001 now U.S. Pat. No. 6,517,714.

BACKGROUND OF THE INVENTION

This invention relates to treatment of liquids to remove particulate materials and, more particularly, to methods and apparatus for treating liquids using ballasted flocculation.

In order to remove contaminants such as suspended solids, turbidity coloring and dissolved materials such as metal salts from liquids such as drinking water, process water, wastewater and the like it is conventional to introduce coagulants and flocculating agents which precipitate dissolved contaminants and induce solid particles to be combined into larger particles which settle more rapidly from the liquid being treated. It is also known to introduce a granular material such as fine sand along with the coagulants and flocculating agents into the liquid to be treated to facilitate the settling of the floc particles.

U.S. Pat. No. 4,927,543 discloses a method and installation for treating liquid by sedimentation using a granular material such as fine sand in which flocculating agents and sand are mixed with a liquid to be treated and supplied to an aggregation area where turbulence is induced to maintain insoluble flocculated material and sand in suspension. The mixture containing flocculated insolubles and the sand is passed into a sedimentation area containing an array of spaced separator plates by which solid particulates are separated from the liquid being treated. A principal disadvantage of this arrangement is the requirement for a separate tank for a settling step, which increases the footprint required. Another disadvantage is the need to convey sand horizontally for significant distances between a sludge tank, a cleaning tank and a mixing tank.

Other ballasted flocculation systems are disclosed in U.S. Pat. Nos. 5,730,864, 5,770,091, 5,800,717, 5,840,195 and 6,010,631 but none of those systems overcomes the disadvantages discussed above with respect to the system of U.S. Pat. No. 4,927,543.

SUMMARY OF THE INVENTION

Accordingly, it is an object of the present invention to provide a method and apparatus for treatment of liquids with ballasted flocculation which overcomes disadvantages of the prior art.

A further object of the invention is to provide a method and apparatus for treating liquids in which liquid contaminants are removed rapidly.

Another object of the invention is to provide a method and apparatus for treatment of liquids with ballasted flocculation which provides a more compact arrangement and operates with greater efficiency than the prior art.

These and other objects of the invention are attained by providing a ballasted flocculation liquid treatment arrangement in which liquid to be treated is mixed with flocculating agents and granular material such as fine sand in a mixing chamber and passed to a flocculating chamber in which turbulence is introduced, preferably in a toroidal circulation pattern, which is sufficient to maintain the granular material in suspension. The flocs generated in the mixing chamber and the flocculation chamber can become attached to particles of granular material which act as a ballast. The granular material and associated flocs then pass into a sludge tank where they can settle to the bottom while permitting liquid containing small particulates and unballasted flocs to return to the flocculator.

At the top of the flocculating chamber, liquid is passed upwardly through a turbulence control arrangement in which flocs and particulates are separated from the liquid and returned by gravity to the flocculator and turbulence is eliminated so that quiescent liquid passes upwardly into a clarification chamber from which any remaining particulates can fall back to the flocculator through the turbulence control arrangement. If necessary, inclined plates or settling tubes may be provided in the clarification chamber to help separate any remaining particulates from the clarified liquid. In a preferred embodiment the sludge tank is next to the mixing chamber and sludge and granular material collected at the bottom of the sludge tank are transferred by a conveyor such as an airlift, for example, to a cleaning device located above the mixing chamber from which cleaned granular material falls by gravity into the mixing chamber and sludge separated from the granular material is removed through a sludge outlet.

The turbulence control device can have any arrangement by which flocs and particulates can be separated from the liquid and the turbulence generated in the flocculation chamber is converted to an essentially non-turbulent or quiescent flow of liquid passing into the clarification chamber to avoid mixing any remaining particulates in the clarified liquid and permit separated particulates to fall back by gravity to the flocculation chamber.

In one embodiment the turbulence control arrangement includes vertically spaced layers of closely spaced bars, preferably oriented at an angle to the bars in adjacent layers, and in another embodiment it includes vertically spaced horizontal arrays of oppositely inclined baffles. A further embodiment includes a honeycomb structure with vertically oriented cells covered by a top plate having orifices leading to the clarification chamber. In another embodiment the turbulence control arrangement has an array of inclined baffles covered by a top plate formed with orifices and surrounded by a trough. In still another embodiment the turbulence control arrangement includes a porous membrane separating the flocculation chamber from the clarification chamber and in a further embodiment the turbulence control arrangement includes a series of closely spaced horizontal gratings. The turbulence control arrangement in an additional embodiment includes a shelf projecting inwardly from the walls of the chamber and inclined downwardly at an angle of about 35° to 55°, preferably about 45°, and extending inwardly to about 10% to 20% of the width of the chamber.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
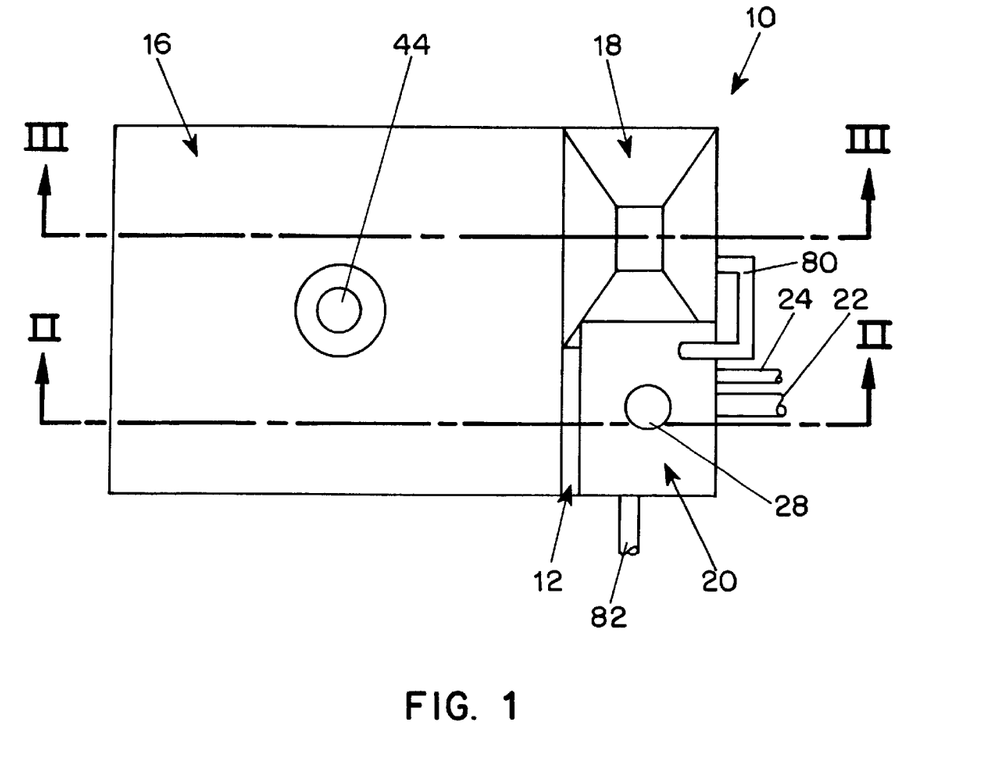
FIG. 1 is a schematic plan view showing the arrangement of a representative embodiment of a system for treating liquids in accordance with the invention.
Figure 2:
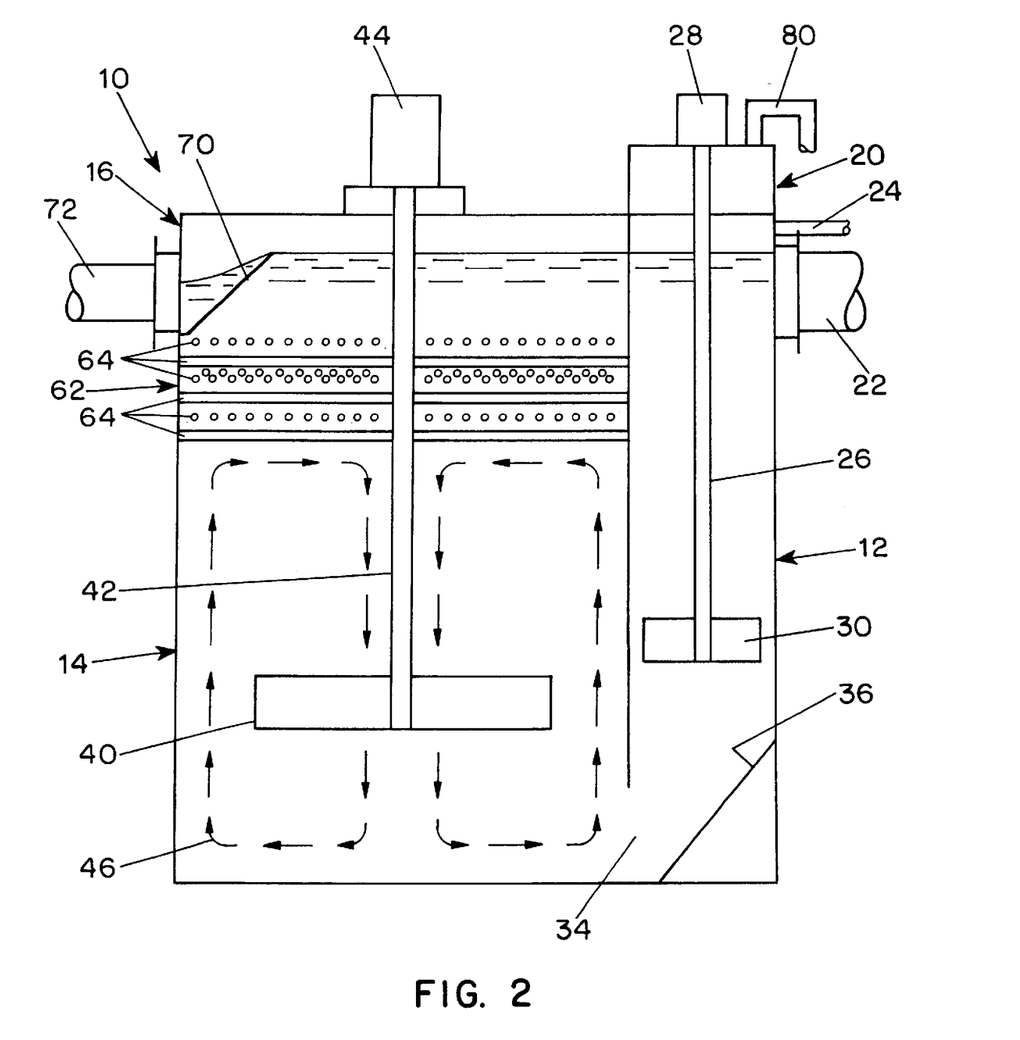
FIG. 2 is a schematic vertical sectional view of the embodiment shown in FIG. 1 taken along the lines II—II of FIG. 1.
Figure 3:
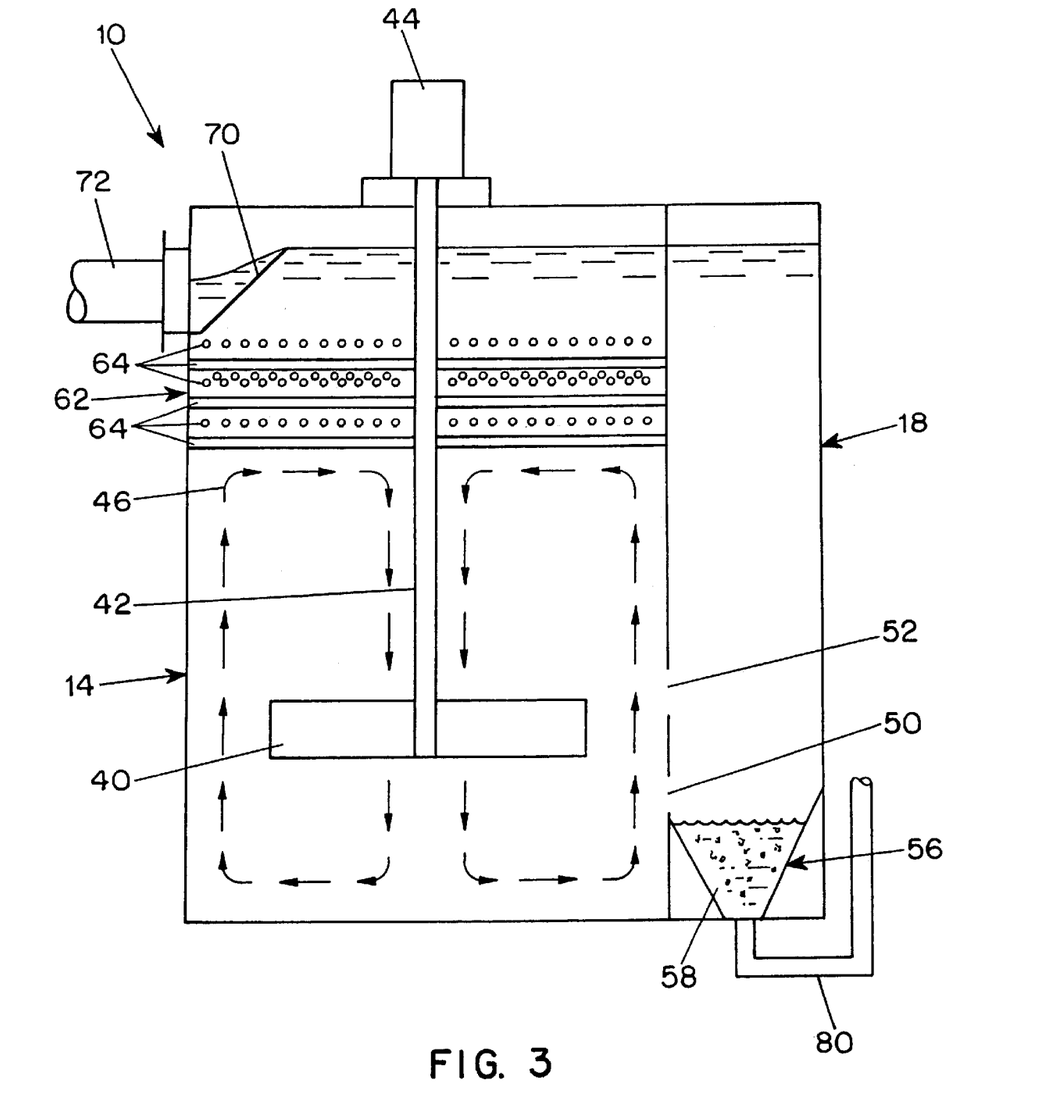
FIG. 3 is a schematic vertical sectional view of the embodiment shown in FIG. 1 taken along the line III—III of FIG. 1.

In the typical embodiment of the invention shown in FIGS. 1–3 of the drawings, a representative arrangement 10 for treatment of liquids using ballasted flocculation includes a mixing chamber 12, a flocculation chamber 14 laterally adjacent to the mixing chamber, a clarification chamber 16 vertically above the flocculation chamber, and a sludge tank 18 laterally adjacent to both the flocculation chamber 14 and the mixing chamber 12. A cleaning device 20 for cleaning granular material is mounted directly above the mixing chamber 12 and the sludge tank 18. It will be noted that the components 12, 14, 16, 18 and 20 are arranged in a compact configuration occupying a generally rectangular space-saving footprint, while permitting convenient construction and efficient operation of the system.

As best seen in FIGS. 1 and 2, a liquid intake line 22 supplies liquid to be treated, preferably containing a coagulant, to the top of the mixing chamber 12 which also receives flocculating agents through a line 24 as well as clean granular material, such as fine sand particles, from the cleaning device 20 which is disposed above the mixing chamber so that cleaned sand particles can fall into it by gravity. Within the mixing chamber 12 a vertical shaft 26, rotated by a motor 28 mounted at the top of the cleaning device, carries a set of mixing blades 30 arranged to mix the influent liquid, flocculating agents and granular particles as they pass downwardly through the mixing chamber.

Preferably, the size of the mixing chamber and the liquid flow rate are selected so that the mixture passes through the mixing chamber in about one to three minutes. The granular material preferably comprises fine sand particles having, for example, a size of about 25: to about 500: desirably about 100: to about 300:.

At the bottom of the mixing chamber 12, one side wall which is common to the flocculation chamber 14 has an opening 34 leading to the lower part of the flocculation chamber and the opposite wall has an inclined surface 36 oriented to direct the mixture of liquid, flocculating agent and granular medium through the opening 34 into the flocculation chamber.

In the embodiment illustrated in FIGS. 1–3, the flocculation chamber 14 has a set of turbulence generating blades 40 mounted on a shaft 42 which is driven by a motor 44 so as to circulate the mixture including the granular medium as it moves upwardly through the flocculation chamber. Within the flocculation chamber 14, toroidal vertical and horizontal liquid flow patterns 46 are induced by the blade set 40 to maintain the solids in suspension, causing liquid to move upwardly along the walls of the chamber and downwardly in the interior of the chamber, with inward and outward horizontal flow along the top and bottom of the chamber, respectively. This circulation promotes flocculation and accumulates particulate material in the mixture into large flocs attached to the granular particles.

As best seen in FIG. 3, an opening 50 is provided in a common wall between the flocculation chamber 14 and the sludge tank 18 at a location below the set of blades 40 and another opening 52 located above the blade set 40. These openings permit floc particles to be circulated into the sludge tank 18 through one opening and out of the sludge tank through the other opening by the flows generated by the blade set 40 as shown by the arrows 54 in FIG. 4. Within the sludge tank, as shown by the arrows 60, the larger and heavier ballasted flocs fall into a hopper 56 and accumulate as sludge 58 while lighter or unballasted flocs are drawn back into the flocculation chamber through the other opening in the common wall for recirculation in the flocculation chamber.

In order to prevent the turbulence generated by the blade set 40, which is necessary to promote flocculation, from being transmitted into the clarification chamber 16 as liquid flows into it, a turbulence control arrangement 62 is disposed between the clarification chamber and the flocculation chamber 14. The turbulence control arrangement 62, which extends horizontally across the top of the flocculation chamber at a location above the opening 52 is arranged to cause liquid to flow from the flocculation chamber 14 to the clarification chamber in a relatively quiescent manner and without the turbulence induced by the rotating blades 40 in the flocculation chamber and, at the same time, to separate flocs and particulates from the liquid flowing upwardly and return them to the flocculator.

In the particular embodiment shown in FIGS. 2 and 3, the turbulence control arrangement 62 is a diffusion grating or grid formed by a series of layers 64 containing horizontally extending bars with the bars of adjacent layers disposed at an angle to each other and preferably in orthogonal directions. In this embodiment there are six layers 64 of bars but more or fewer layers may be used. The spacing between adjacent bars in each layer is preferably about one quarter inch to one and one half inches, and desirably about one half inch to one inch and the layers are preferably spaced by about one to three inches This arrangement causes upwardly moving liquid to emerge from the turbulence control arrangement in a smooth, uniform pattern without substantial turbulence while separating flocs and particulates from the liquid and causing them to fall by gravity back into the flocculation chamber 14.

Above the turbulence control arrangement the liquid flows into the clarification chamber 16 in a quiescent manner, permitting any suspended particulates that were not removed by the turbulence control arrangement to fall to the bottom of the chamber from which they pass downwardly through the turbulence control arrangement and back into the flocculation chamber 14. At the top of the chamber 16, the clarified liquid flows over a weir 70 and leaves the unit through an outlet 72.

Figure 4:
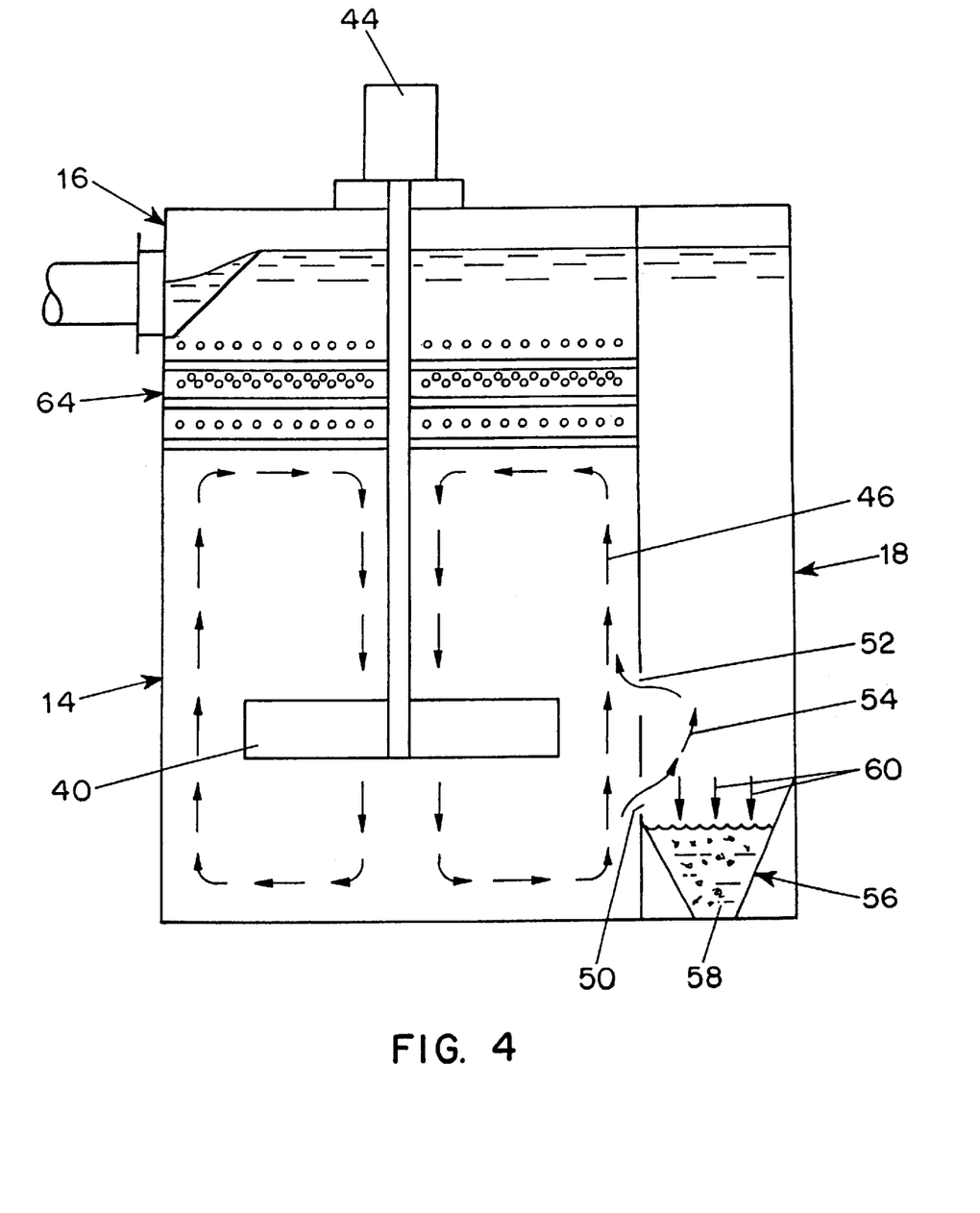
FIG. 4 is an enlarged schematic view illustrating the flow of liquid and ballasted flocs from the flocculation chamber to the sludge tank in the embodiment of FIGS. 1–3.

In FIG. 4 the arrows 54 illustrate the circulation of flocs through the openings 50 and 52 between the flocculation chamber 14 and the sludge tank 18. In the arrangement shown in FIG. 4 ballasted flocs circulate from the region below the blades 40 into the sludge tank, where the heavier ballasted flocs settle into the hopper 56 as sludge 58, as indicated by the arrows 60. At the same time, the circulation pattern 46 induced by the blades 40 causes lighter flocs to return through the upper opening 52 between the flocculator and the sludge tank where they are recirculated in the flocculation chamber. Alternatively, by changing the flow pattern 46 in the flocculator, the flocs may enter the sludge tank through the upper opening 52 and liquid and light flocs return to the flocculator through the opening 50.

Figure 5:
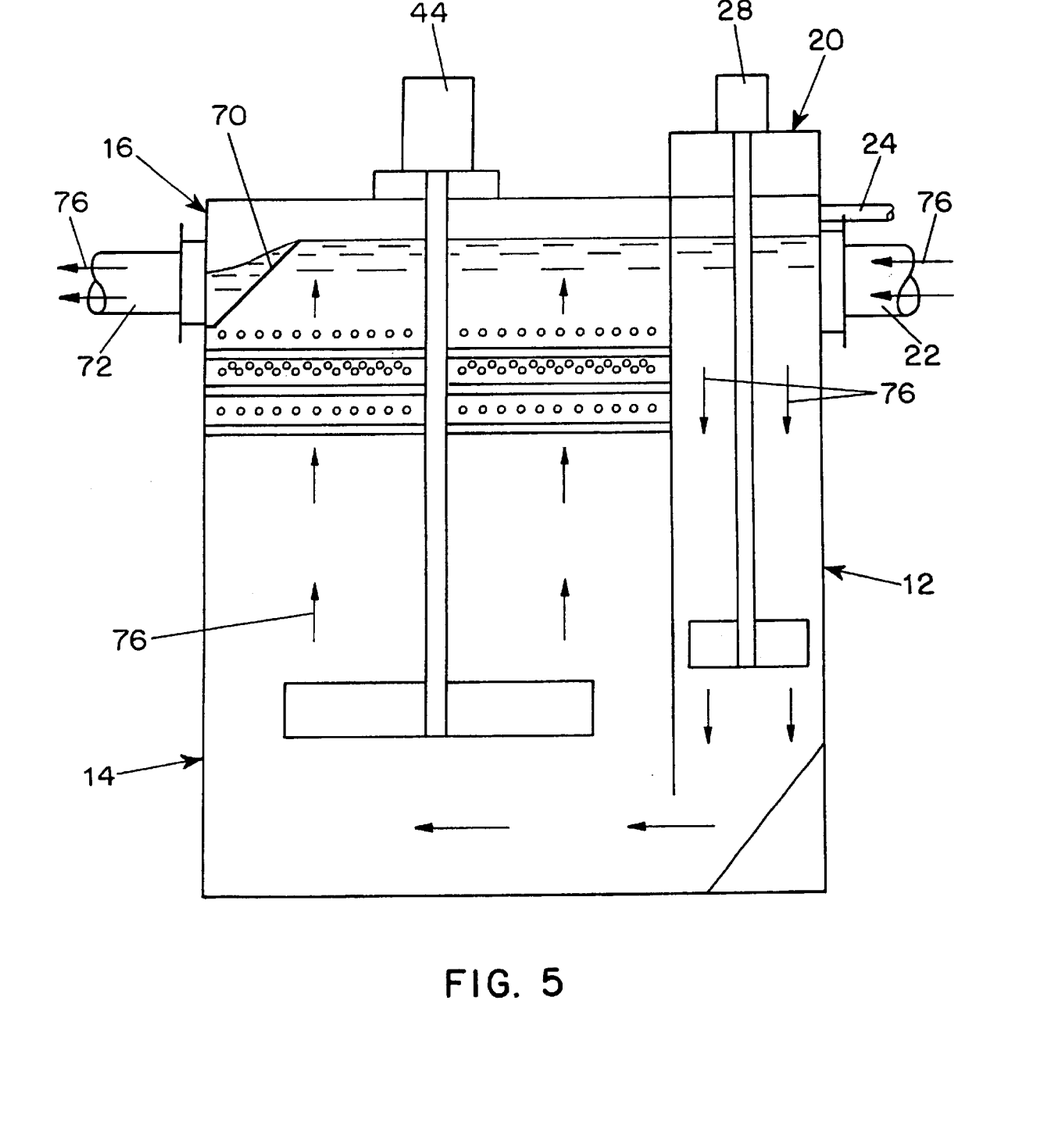
FIG. 5 is a schematic view similar to FIG. 2 illustrating the flow of liquid being treated through the mixing chamber, the flocculation chamber and the clarification chamber.

In FIG. 5, arrows 76 indicate the net flow of liquid from the inlet 22 through the mixing chamber 12, the flocculation chamber 14 and the separation chamber 16 to the outlet 72.

In order to remove the sludge 58 from the hopper 56 and recirculate the granular particles, the sludge is transported upwardly by a conveyor such as an airlift 80, shown in FIGS. 1–3, to the cleaning tank 20 at the top of the mixing chamber 12 where the granular particles are cleaned and dirt is removed by any conventional arrangement such as, for example, countercurrent flow of clean liquid with respect to the granular particles as described, for example, in U.S. Pat. Nos. 4,126,546 and 4,197,201 the disclosures of which are incorporated by reference herein. The granular particles cleaned by the cleaning device 20 fall into the mixing chamber 12 where they are mixed with the liquid to be treated and flocculating agents in the manner described above while the dirt removed from the granular particles in the cleaning tank is directed through a waste line 82 (FIG. 1) for disposal.

Figure 6:
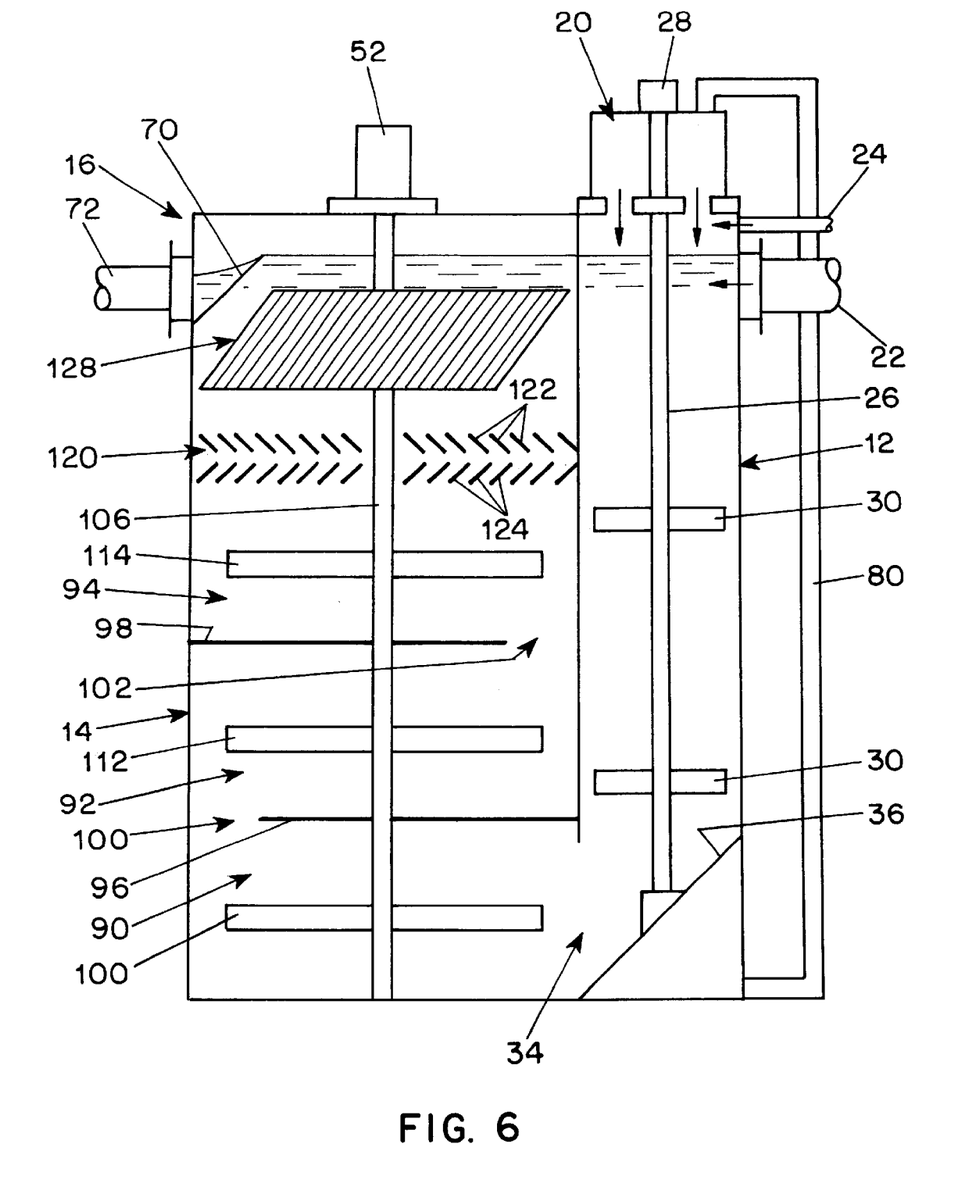
FIG. 6 is a schematic view similar to FIG. 2 illustrating an alternative embodiment of the invention containing a plurality of blade sets for producing turbulence in each of the mixing chamber and the flocculation chamber.
Figure 7:
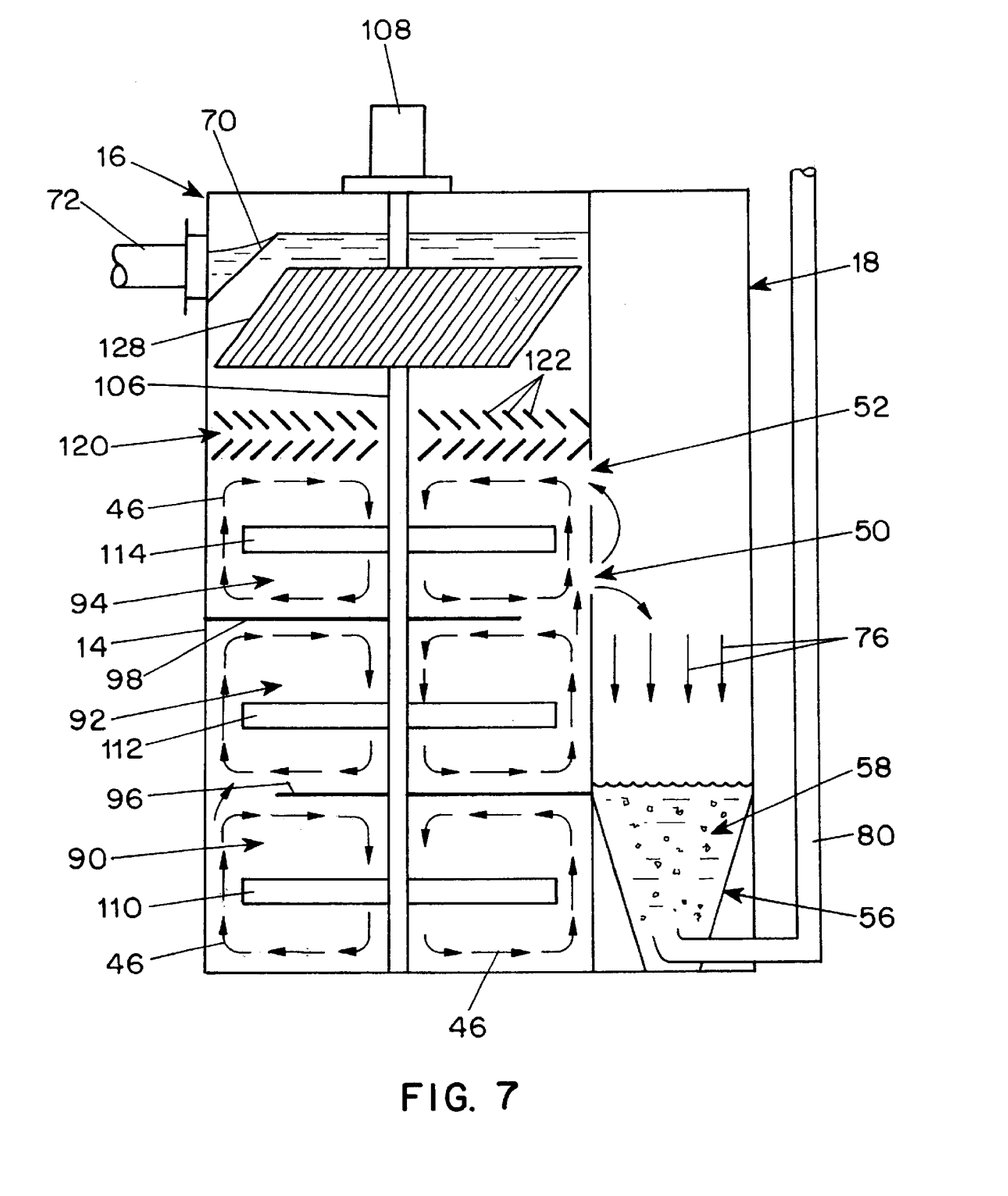
FIG. 7 is a view similar to FIG. 3 showing the toroidal circulation of liquid in the flocculation chamber in the embodiment of FIG. 6.

In an alternative embodiment, shown in FIGS. 6 and 7, the drive shaft 26 in the mixing chamber 12 carries two sets of mixing blades 30 and the flocculation chamber 14 is divided into three vertically spaced compartments 90, 92 and 94 by vertically spaced horizontal partitions 96 and 98 which leave openings 100 and 102 at opposite sides of the chamber to cause the liquid to pass upwardly on one side of the chamber from the compartment 90 to the compartment 92 and on the opposite side of the chamber from the compartment 92 to the compartment 94. A shaft 106, extending downwardly through the flocculation chamber 14 is driven by a motor 108 to rotate three corresponding sets of blades 110, 112 and 114 so as to circulate the mixture including the granular medium in toroidal flow patterns 46 in each of the compartments, thereby promoting flocculation and accumulating particulate material in the mixture into large flocs attached to the granular particles.

In the embodiment shown in FIGS. 6 and 7, a turbulence control arrangement 120 consists of vertically adjacent horizontal arrays of baffles 122 and 124 which are inclined in opposite directions respectively from the vertical and closely spaced, preferably by about one-half to two inches apart, each of the baffles having a vertical extent of about one to four inches and preferably about two to three inches. If desired, more than two horizontal arrays of baffles may be provided. As in the embodiment of FIGS. 1–3, this turbulence control arrangement causes upwardly moving liquid to emerge into the clarification chamber in a smooth, uniform pattern without substantial turbulence while separating flocs and particulates from the liquid and causing them to fall by gravity back to the flocculation chamber 14. If desired, an array 128 of inclined settling plates or settling tubes may be provided in the clarification chamber 16 to facilitate gravity separation and removal of any remaining particulates in the liquid passing upwardly through the clarification chamber.

Figure 8:
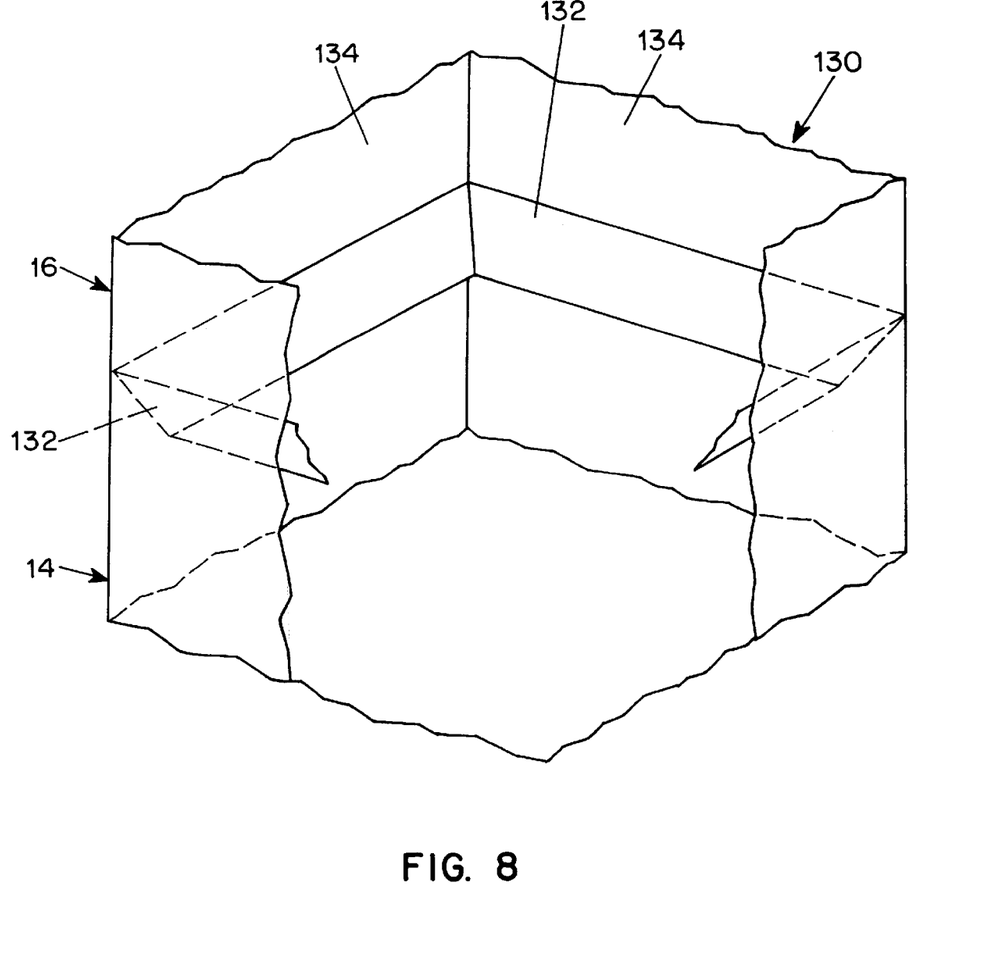
FIGS. 8–12 are schematic fragmentary perspective views showing five further representative turbulence control arrangements for use in the invention.

In a further alternative turbulence control arrangement 130, schematically illustrated in the fragmentary view of FIG. 8, a shelf 132 projects inwardly at an angle of about 30° to about 60°, preferably about 45°, from the walls 134 of the flocculation chamber 14. The shelf 132 is located above the upper opening 52 between the flocculator chamber 14 and the sludge tank 18 and extends inwardly to about 10–20% of the width of the chamber. The shelf thus projects beneath the optional array 128 of settling plates or tubes in the clarification chamber shown in FIG. 7, causing solids descending in that region to flow back into the flocculation chamber and preventing liquids and ballasted flocs rising along the sides of the flocculation chamber 14 from entering the clarification chamber.

Figure 9:
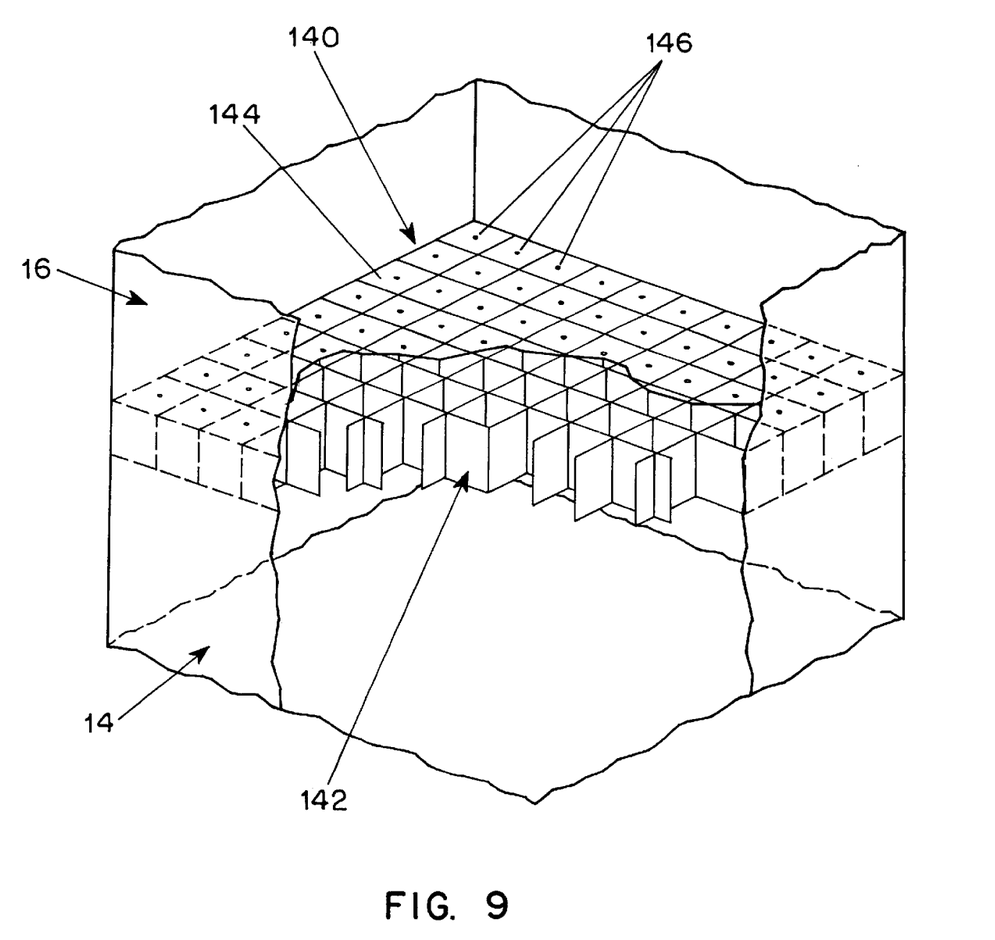

Another alternative turbulence control arrangement 140, schematically illustrated in FIG. 9, contains a vertical honeycomb array of cells 142 covered by a top plate 144 having orifices 146 communicating between each cell of the honeycomb and the clarification chamber 16, thereby causing the upward flow of liquid from the flocculation chamber 14 to be uniform and quiescent.

Figure 10:
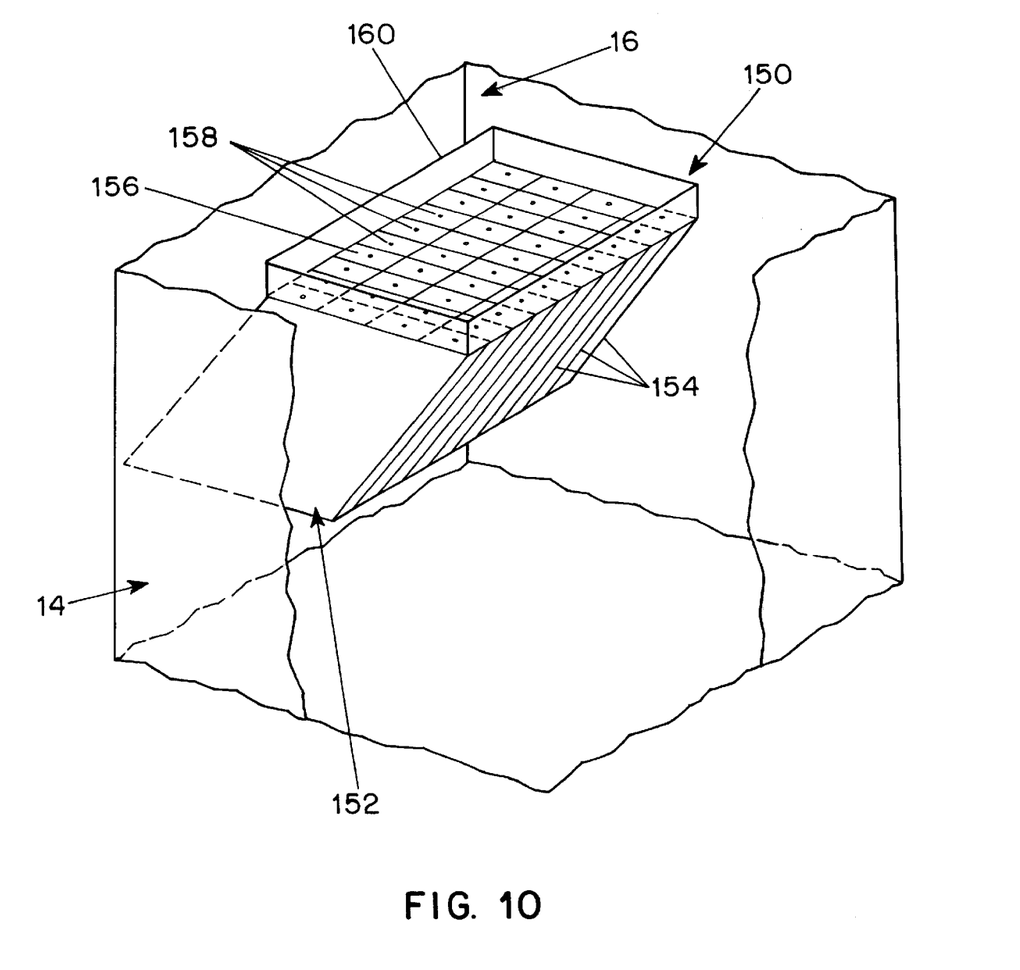

In a further alternative embodiment, shown in FIG. 10, a turbulence control arrangement 150 includes an array 152 of inclined plates 154 covered by a top plate 156 containing orifices 158 of the type described above with respect to FIG. 9. The top plate 156 is surrounded by an effluent trough 160 to guide the liquid upwardly from the orifices out of the turbulence control arrangement.

Figure 11:
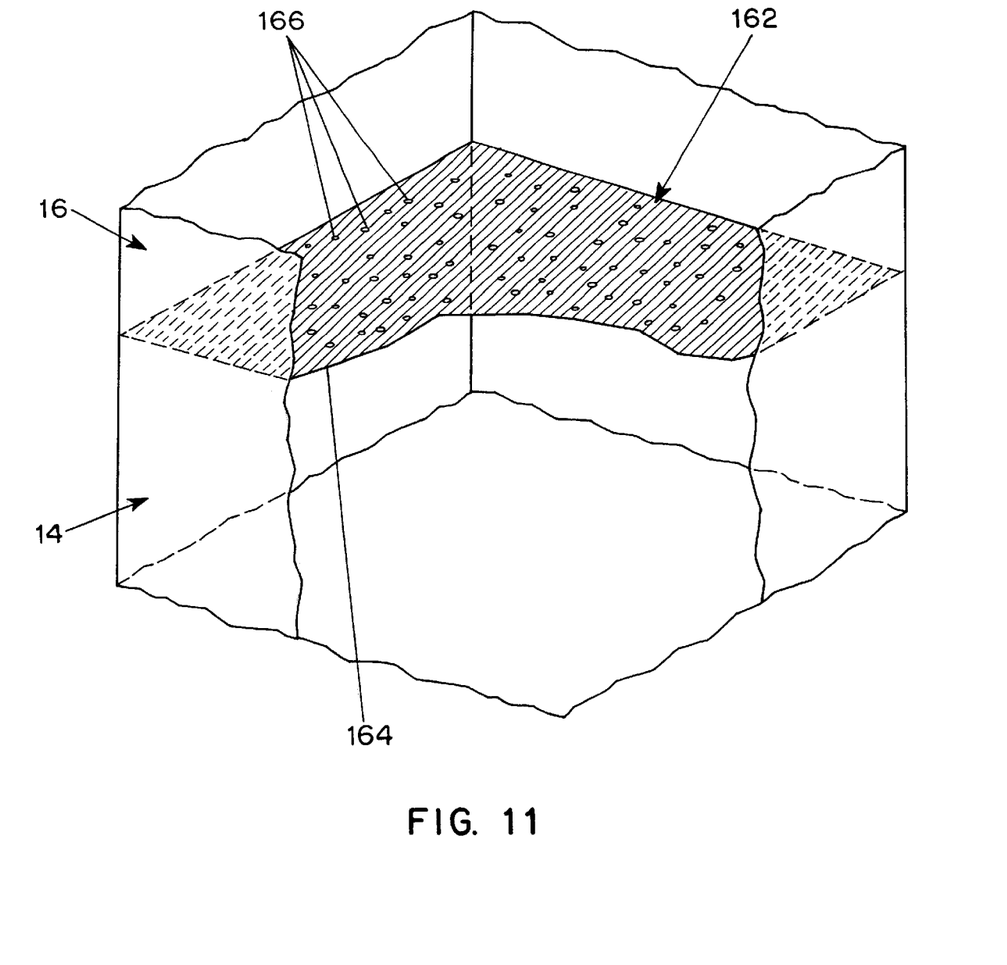

A further embodiment, shown in FIG. 11, includes a turbulence control arrangement 162 containing a porous membrane 164 having sufficient porosity to allow liquid to flow upwardly from the flocculation chamber 14 to the clarification chamber 16 without substantial impedance while at the same time converting the turbulent flow generated in the flocculation chamber to a quiescent upward flow in the clarification chamber and causing flocs and particulates to be separated and fall back into the flocculation chamber. For this purpose, the membrane preferably has openings 166 with sizes in the range from about 100 $\mu$ to about 1000 $\mu$, preferably about 300 $\mu$ to about 600 $\mu$.

Figure 12:
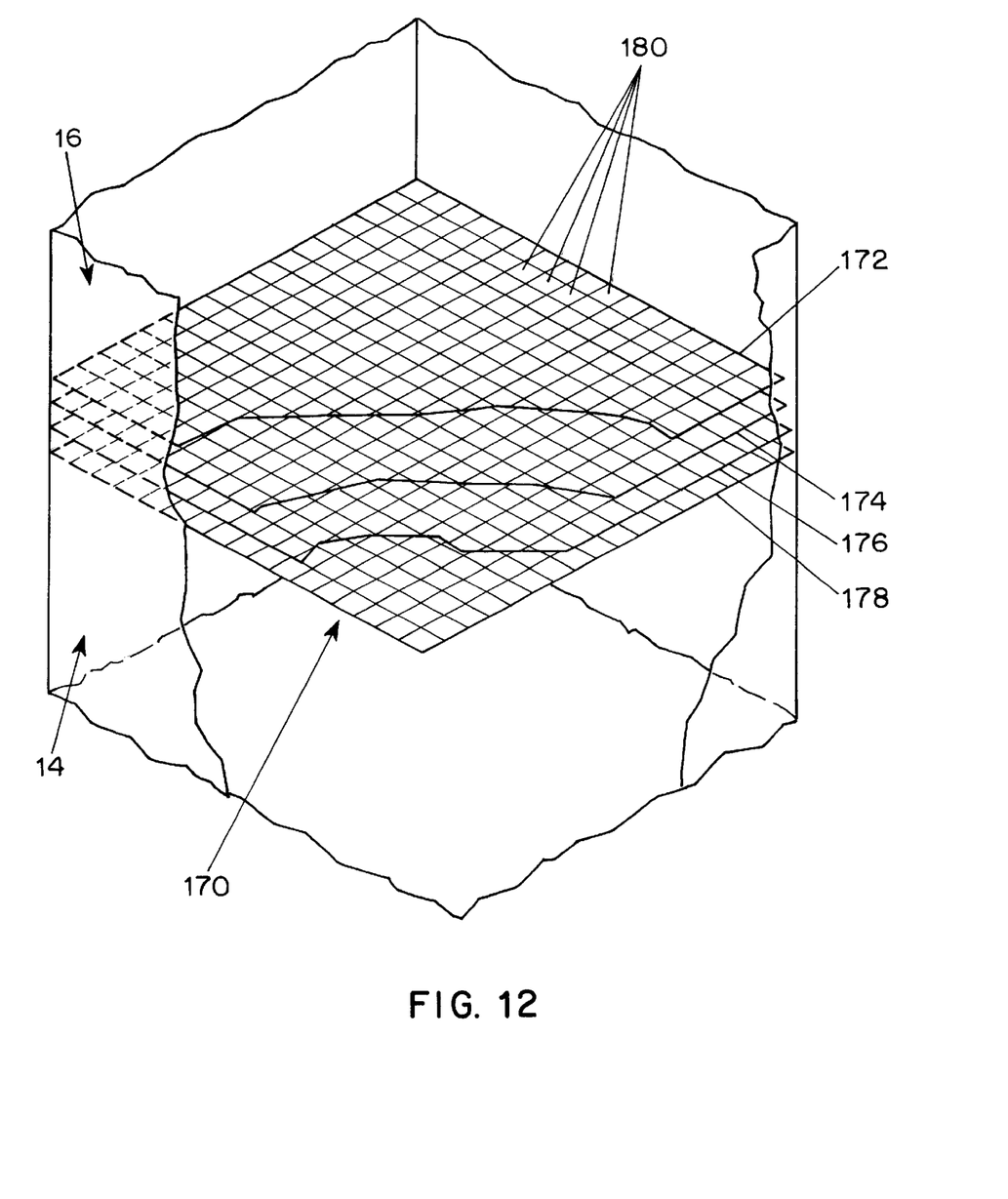

In the embodiment shown in FIG. 12 a turbulence control arrangement 170 contains a series of vertically spaced horizontal screens extending across the top of the flocculation chamber 14. In the illustrated example, four screens 172, 174, 176 and 178 are provided, but there may be more and fewer screens. The screens 172–178 have openings 180 which are large enough to assure adequate flow of liquid from the flocculation chamber 14 to the clarification chamber 16 and to permit any remaining particulates to fall by gravity from the clarification chamber into the flocculation chamber while, at the same time, inhibiting turbulence in the flow of liquid from the flocculation chamber to the separation chamber. The openings 180 may have a size in the range from about 5 mm to about 50 mm, for example, and preferably from about 15 mm to about 30 mm.

Referring to the toroidal flow patterns 46 shown in FIGS. 2, 3 and 7, below the turbulence control arrangement 62 or 120, the flow patterns provide vertical velocities in the flocculation chamber 14 which are more than sufficient to keep the granular materials and ballasted flocs in suspension. As shown by the patterns 46, the turbulence control arrangement redirects the upward vertical velocities laterally and thus contains the turbulence within the flocculation chamber 14. The turbulence control arrangement does, however, allow a slow upward vertical motion of liquid corresponding to the flow through the outlet 72 as shown in FIG. 5. The result is that the ballasted flocs are contained within the flocculation chamber. Because the settling rate of ballasted flocs is faster than the upward velocity due to liquid flow, the clarified water rises from the top of the flocculation chamber leaving the ballasted flocs behind.

The effect of the turbulence control arrangement may be compared with the behavior of a square mechanically mixed flocculation chamber in which the free water surface defines the top of the flocculation volume. In this case the centrally mounted mixer drives the flow downwardly in the middle of the chamber where it spreads across the floor of the chamber, up the walls and then across the top to the center again. This produces the toroidal-shaped circulation patterns 46 shown in FIGS. 2, 3 and 7. Because the blade sets 40, 110, 112 and 114 rotate in the horizontal plane, there is also additional upward flow in the corners as the horizontal flow impacts the walls and changes direction. Observation of the free liquid surface of a chamber having this flow pattern shows a surface profile higher around the outside edges and particularly higher in the corners. Liquid boils up in these places and then flows across towards the center. The theoretical upper extent of the flocculation volume is limited by gravity but, in the illustrated arrangements, the upper extent is limited by the turbulence control arrangements 62 and 120 that redirect the upward flow back toward the center of the chamber.

Within the toroidal circulation pattern 46 the total net upward movement due to the mechanical mixing must sum to zero, as the downward component is equal to the upward component. The function of the turbulence control arrangement is to define the upper boundary of this process. It should be understood that the effective settling of the ballasted flocs occurs primarily at the top of the flocculation chamber rather than within the turbulence control arrangement. The restriction of upward flow created by the turbulence control arrangement is hydraulically effective some distance below the top of the chamber and the high upward velocities due to mixing do not reach the top of the chamber.

With the ballasted floc liquid treatment arrangement in accordance with the invention, solids separation takes place at the turbulence control arrangement directly above the flocculation chamber and, if necessary, in the clarification chamber above the turbulence control arrangement so that the clarification and flocculation chambers occupy the same footprint and direct flow of liquid is provided from the flocculation chamber into the clarification chamber while causing any separated particulates to fall by gravity from the turbulence control arrangement and the clarification chamber to the flocculation chamber, thus eliminating the need for continuous collection of sludge from the bottom of a separation chamber as in prior art arrangements. In addition, ballasted flocs are drawn laterally from the flocculation chamber to the sludge tank to provide a single sludge collection location and smaller and lighter flocs which do not fall into the sludge hopper are returned from the sludge tank to the flocculation chamber for recirculation.

Furthermore, because clarified liquid leaves the ballasted flocs in the flocculation chamber, a high level of solids may be maintained there, up to about 5 to 10 times the level in the influent stream at the inlet 22, if desired. This enhances the flocculation efficiency and permits lateral withdrawal of solids from the flocculation tank into the sludge tank. Also, since it is not necessary to clarify the liquid flowing from the flocculation chamber to the sludge tank, the floc loading rate of liquid flowing toward the sludge tank can be relatively high and need only match the settling rate of the biggest ballasted flocs since the smaller flocs can be returned to the flocculation chamber. Thus, it is possible to remove solids at a rate that matches the influent solids rate.

Also, because the sludge collection tank is immediately adjacent to the mixing tank, sludge can be pumped up to the cleaning device vertically above the sludge tank and the mixing tank with either an airlift or another form of pump without requiring horizontal transport to any significant extent.

In a typical liquid treatment arrangement according to the invention in which the chambers are integrated into a unit in the manner showing the drawings, the footprint occupied by the flocculation chamber, the turbulence control arrangement, and the clarification chamber above it is about 7.75 feet square, the footprint occupied by the adjoined mixing chamber and sludge tank is about 4.0 feet by 7.25 feet, and the height of the integrated unit is about 16 feet, and it has a net liquid through flow rate capacity of about 700 gallons per minute.

Although the invention has been described herein with reference to specific embodiments, many modifications and variations therein will readily occur to those skilled in the art. Accordingly, all such variations and modifications are included within the intended scope of the invention.

I claim:

1. A method for treating liquid with ballasted flocculation comprising:

mixing liquid to be treated with a coagulant, flocculating agent and granular material in a mixing chamber;

supplying the mixture of liquid, coagulant, flocculating agent and granular material to a flocculator;

applying turbulence to the mixture in the flocculator to promote flocculation and generate ballasted flocs;

transferring ballasted flocs from the flocculator to a sludge tank;

passing liquid upwardly from the flocculator to a clarification chamber through a turbulence control arrangement extending horizontally between the flocculator and the clarification chamber for separating liquid from flocs and particulates and permitting liquid to pass upwardly from the flocculator to the clarification chamber without substantial turbulence in the clarification chamber while permitting particulates to fall from the clarification chamber to the flocculator;

removing flocs and particulates from the liquid in the turbulence control arrangement; and removing clarified liquid from the clarification chamber.

2. A method according to claim 1 including recirculating granular material and sludge from the bottom of the sludge tank to a cleaning device and separating granular material from the sludge and returning cleaned granular material to the top of the mixing chamber.

3. A method according to claim 2 wherein the flocculator and the sludge tank have a common wall and including passing ballasted flocs from the flocculator into the sludge tank through a first opening in the common wall for gravity separation of ballasted flocs from liquid in the sludge tank and returning liquid from the sludge tank to the flocculator through a second opening in the common wall.

4. A method according to claim 1 wherein turbulence in liquid passing from the flocculator to the clarification chamber is inhibited by passing it through a plurality of vertically spaced horizontal arrays of spaced bars.

5. A method according to claim 4 wherein the bars in each array extend at an angle to the bars in an adjacent array.

6. A method according to claim 1 wherein turbulence in liquid passing from the flocculator to the clarification chamber is inhibited by passing it through vertically spaced horizontal arrays of oppositely inclined baffles.

7. A method according to claim 1 wherein turbulence in liquid passing from the flocculator to the clarification chamber is inhibited by passing it through a horizontal array of vertically oriented honeycomb cells covered by a plate containing orifices.

8. A method according to claim 1 wherein turbulence in liquid passing from the flocculator to the clarification chamber is inhibited by passing it through an array of inclined plates covered by a top plate having orifices and surrounded by an effluent trough.

9. A method according to claim 1 wherein turbulence in liquid passing from the flocculator to the clarification chamber is inhibited by passing it through a membrane having openings which permit liquid to flow from the flocculator to the clarification chamber without inducing turbulence in the clarification chamber.

10. A method according to claim 1 wherein turbulence in liquid passing from the flocculator to the clarification chamber is inhibited by passing it through a plurality of vertically spaced horizontally extending screens having openings which permit liquid to flow from the flocculator to the clarification chamber without inducing turbulence in the clarification chamber.

* * * * *